US012565454B2

(12) United States Patent
Callaway

(10) Patent No.: US 12,565,454 B2
(45) Date of Patent: Mar. 3, 2026

(54) MULTILAYER INTERFACE COATING WITH THERMALLY-GROWN OXIDE FOR IMPROVED DURABILITY

(71) Applicant: Raytheon Technologies Corporation, Farmington, CT (US)

(72) Inventor: Evan B. Callaway, Santa Barbara, CA (US)

(73) Assignee: RTX Corporation, Farmington, CT (US)

( * ) Notice: Subject to any disclaimer, the term of this patent is extended or adjusted under 35 U.S.C. 154(b) by 854 days.

(21) Appl. No.: 17/866,024

(22) Filed: Jul. 15, 2022

(65) Prior Publication Data

US 2024/0018060 A1      Jan. 18, 2024

(51) Int. Cl.
| | |
|---|---|
| *C04B 35/628* | (2006.01) |
| *C04B 35/80* | (2006.01) |
| *C04B 41/50* | (2006.01) |
| *C04B 41/52* | (2006.01) |

(Continued)

(52) U.S. Cl.
CPC .... *C04B 41/5064* (2013.01); *C04B 35/62849* (2013.01); *C04B 35/62863* (2013.01); *C04B 35/62868* (2013.01); *C04B 35/62884* (2013.01); *C04B 35/62886* (2013.01); *C04B 35/62894* (2013.01); *C04B 35/62897* (2013.01); *C04B 35/80* (2013.01); *C04B 41/5059* (2013.01); *C04B 41/524* (2013.01); *C04B 41/87* (2013.01); *C04B 41/89* (2013.01); *C04B 2235/3826* (2013.01); *C04B 2235/386* (2013.01); *C04B 2235/5252* (2013.01); *C04B 2235/9684* (2013.01)

(58) Field of Classification Search
None
See application file for complete search history.

(56) References Cited

U.S. PATENT DOCUMENTS

| | | | | |
|---|---|---|---|---|
| 5,952,100 | A | * | 9/1999 | Corman et al. ... C04B 35/62897 |
| 7,427,428 | B1 | * | 9/2008 | DiCarlo et al. ... C04B 35/62884 |
| 9,512,044 | B2 | * | 12/2016 | Lazur ................ C04B 35/62894 |

(Continued)

FOREIGN PATENT DOCUMENTS

| | | | | |
|---|---|---|---|---|
| CN | 104817336 | B | | 7/2017 |
| CN | 109553430 | A * | 4/2019 | ........... C04B 35/622 |

(Continued)

OTHER PUBLICATIONS

Hagen Klemm et al. "delayed Formation of Thermally Grown Oxide in Environmental Barrier Coatings for Non-Oxide Ceramic Matrix Composites" Coatings 2020, 10, 6 (Year: 2019).*

(Continued)

*Primary Examiner* — Melvin C. Mayes
(74) *Attorney, Agent, or Firm* — Kinney & Lange, P.A.

(57) ABSTRACT

A coated fiber structure for use in a ceramic matrix composite comprises a fiber and a coating system applied to and circumscribing the fiber. The coating system comprises a first boron nitride layer, a silicon carbide layer extending coaxially with and in direct contact with the first boron nitride layer, a first thermally-grown oxide layer formed on the silicon carbide layer, and a second boron nitride layer extending coaxially with and in direct contact with the first thermally-grown oxide layer.

16 Claims, 3 Drawing Sheets

(51) Int. Cl.
  *C04B 41/87*   (2006.01)
  *C04B 41/89*   (2006.01)

(56) References Cited

U.S. PATENT DOCUMENTS

| | | | | |
|---|---|---|---|---|
| 9,650,303 | B2 * | 5/2017 | Chamberlain | .......... C04B 35/78 |
| 9,969,655 | B2 | 5/2018 | Wan et al. | |
| 10,822,966 | B2 | 11/2020 | Chapman et al. | |
| 2015/0284295 | A1 * | 10/2015 | Magdefrau | ....... C04B 35/62868 |
| | | | | 501/92 |
| 2016/0376691 | A1 * | 12/2016 | Wadley et al. | ......... C23C 4/134 |
| 2023/0382811 | A1 * | 11/2023 | Sudre et al. | ............ C04B 35/80 |
| 2024/0043345 | A1 * | 2/2024 | Callaway et al. | ...... C04B 35/80 |

FOREIGN PATENT DOCUMENTS

| | | | | | |
|---|---|---|---|---|---|
| CN | 112479717 | A | * | 3/2021 | .......... C04B 35/571 |
| CN | 113979752 | A | * | 1/2022 | .......... C04B 35/571 |
| FR | 3059322 | A1 | | 6/2018 | |
| WO | WO-2014150393 | A2 | * | 9/2014 | .......... C04B 35/565 |

OTHER PUBLICATIONS

Roger R. Naslain et al. "single- and Multilayered Interphases in SiC/SiC Composites Exposed to Severe Environmental Conditions: an Overview" International Journal of Applied Ceramic Technology 7(3) 263-275 (Year: 2010).*
Chaokun Song et al. "Long-term ceramic matrix composite for aeroengine" Journal of Advanced Ceramics 11(9): 1343-1374 (Year: 2022).*
Megan Elizabeth Wilson "Oxidation of SiC/BN/SIC Ceramic Matrix Composites and their Constituents" A Dissertation Presented to the faculty of the School of Engineering and Applied Science University of Virginia (Year: 2018).*
CN 109553430 A Translation (Year: 2019).*
CN 113979752 A Translation (Year: 2022).*
CN 112479717 A Translation (Year: 2021).*
Subodh K Mital et al. "Modeling of the Influence of Thermally Grown Oxide (TGO) Layers on the Driving Forces in Environmental Barrier Coating Systems" NASA STI (Year: 2021).*
Extended European Search Report for EP Application No. 23181769. 3, dated Dec. 15, 2023, 9 pages.
R. Naslain, et al., "Boron Nitride Interphase in Ceramic-Matrix Composites", from Journal of the American Ceramic Society, vol. 74, No. 11, 1991, pp. 2482-2488.

* cited by examiner

MULTILAYER INTERFACE COATING WITH THERMALLY-GROWN OXIDE FOR IMPROVED DURABILITY

BACKGROUND

The present invention relates to ceramic matrix composites, and more particularly to the formation of corrosion-resistant coatings therein.

Fiber-reinforced ceramic matrix composites (CMCs) are known and used for components that are exposed to high temperatures and corrosive conditions that can degrade other kinds of materials. Under such severe conditions, such as the operating conditions in aerospace and aircraft applications, even ceramic materials are vulnerable to degradation. Over time, ceramic composites can form microcracks that further expose the ceramic material to oxygen or other corrosive elements, which form undesirable phases to the detriment of the properties of the ceramic matrix composite component.

Fibers can be coated with a layer of boron nitride to form a weak interface between the fibers and matrix material to enable desired composite characteristics. Boron nitride can sometimes form with a disordered structure that readily oxidizes to molten boria at high temperatures, exposing fibers to oxidation and causing fiber degradation. A protective layer of silicon carbide can be included in the coating system, but the roughness of such layers can lead to cracking which creates pathways for oxidant ingress to inner boron nitride layers, exposing the fiber to molten borosilicate. Therefore, coating materials with a greater oxidation resistance are desirable.

SUMMARY

A coated fiber structure for use in a ceramic matrix composite comprises a fiber and a coating system applied to and circumscribing the fiber. The coating system comprises a first boron nitride layer, a silicon carbide layer extending coaxially with and in direct contact with the first boron nitride layer, a first thermally-grown oxide layer formed on the silicon carbide layer, and a second boron nitride layer extending coaxially with and in direct contact with the first thermally-grown oxide layer.

A method of forming a ceramic matrix composite comprises forming a fibrous preform by arranging a plurality of ceramic fibers, depositing a first boron nitride layer on the plurality of ceramic fibers, depositing a silicon carbide layer on the first boron nitride layer, forming a first thermally-grown oxide layer on the silicon carbide layer, and depositing a second boron nitride layer on the first thermally-grown oxide layer. The method further comprises depositing a silicon carbide matrix on the fibrous preform.

Figure 1:
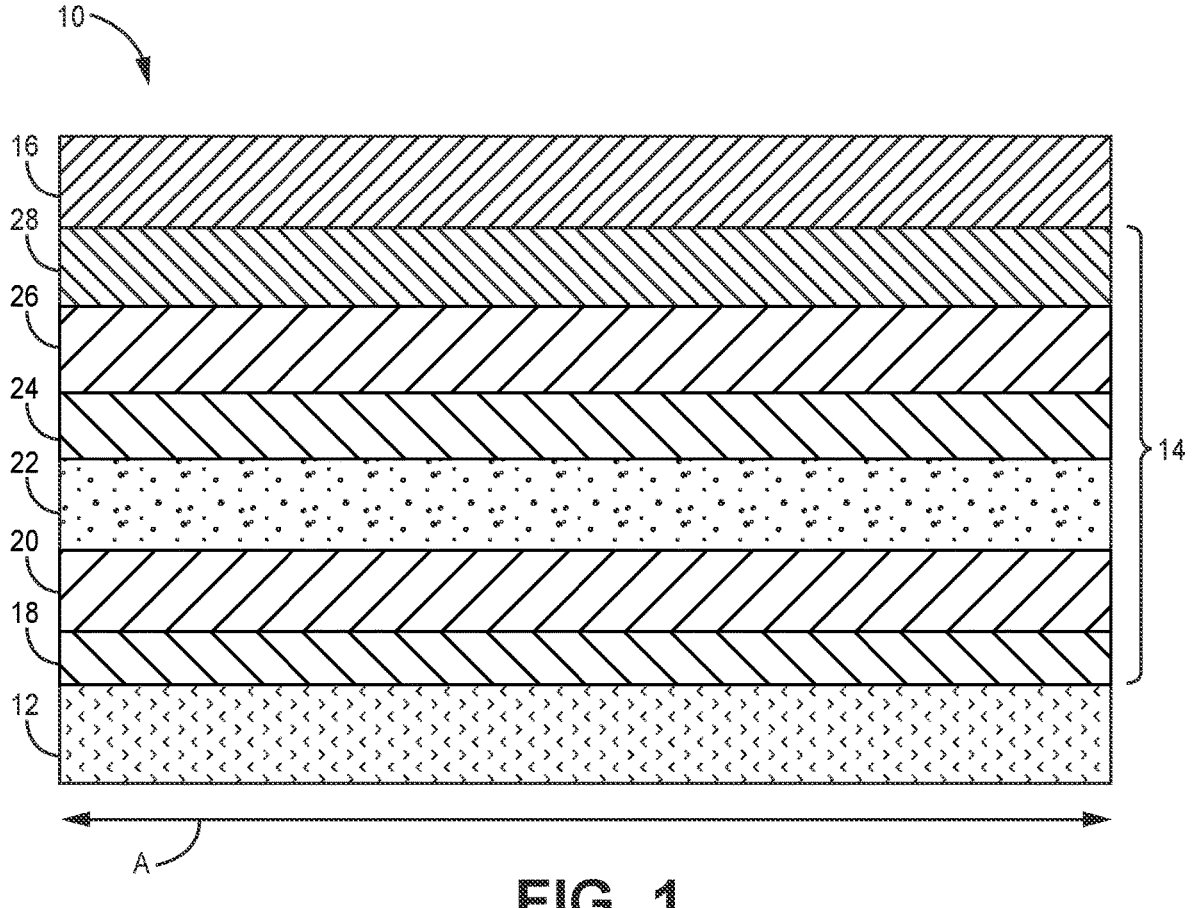
FIG. 1 is a simplified cross-sectional view of a CMC with a fiber coating system.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents various fiber coating systems (i.e., interface coating systems) for improving mechanical, thermal, and/or oxidation resistance properties of CMCs.

FIG. 1 is a simplified cross-sectional illustration of CMC 10 with fiber 12, fiber coating system 14, and matrix 16. CMC 10 can be suitable for use in, for example, a gas turbine engine. Although not visible in FIG. 1, fiber 12 is generally circumscribed by fiber coating system 14 and matrix 16, the various layers of coating system 14 are coaxial with one another and fiber 12. Fiber 12 can be formed from silicon carbide (SiC) or other suitable ceramic material. Multiple fibers 12 of the encompassing CMC 10 can be arranged in various woven or non-woven, unidirectional or multidirectional architectures. Individual fibers 12 have a lengthwise, major dimension disposed along longitudinal fiber axis A. Woven architectures in particular may include multiple, offset (i.e., orthogonal or otherwise angled) longitudinal fiber axes, albeit falling within a common plane of the encompassing fabric or ceramic layer. Matrix 16 can be formed from SiC or other suitable ceramic material.

Beginning closest to fiber 12 and working radially outward toward matrix 16, fiber coating system 14 includes inner thermally-grown oxide (TGO) layer 18, inner boron nitride (BN) layer 20, SiC layer 22, outer TGO layer 24, outer BN layer 26, and optional silicon-doped boron nitride (SiBN) layer 28. As used herein, the terms "inner" and "outer" are relative to one another and fiber 12, such that an outer layer (e.g., outer TGO layer 24) is positioned further from fiber 12 than an inner layer (e.g., inner TGO layer 18) and radially outward from the respective inner layer. One alternative embodiment of fiber coating system 14 can include a single TGO layer, for example, just outer TGO layer 24, while another alternative embodiment can omit SiBN layer 28.

Inner TGO layer 18 can be generally amorphous and have a thickness ranging from nm to 100 nm. A TGO layer thicker than 100 nm at this position can lead to fiber damage. Inner BN layer 20 can have a thickness ranging from 50 nm to 200 nm. SiC layer 22 can have a thickness ranging from 50 nm to 500 nm, and preferably, from 250 nm to 500 nm to provide greater protection, as is discussed in greater detail below. Outer TGO layer 24 can also be generally amorphous and have a thickness ranging from 50 nm to 200 nm. The relatively thicker (compared to inner TGO layer 18) TGO layer 24 is suitable for smoothing SiC layer 22, as is discussed in greater detail below. Outer BN layer 26 and SiBN layer 28 can each have a thickness ranging from nm to 200 nm.

Figure 2A:
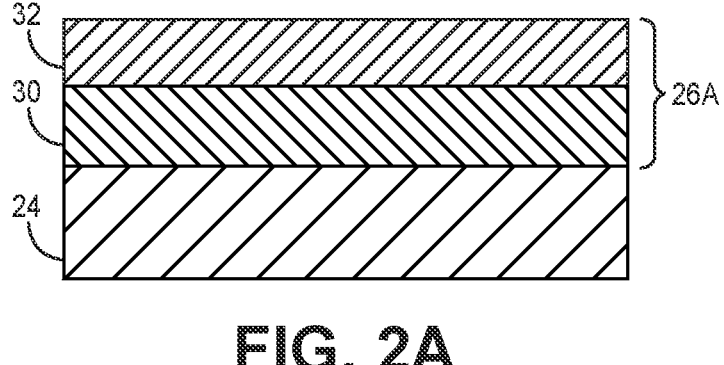
FIGS. 2A and 2B are simplified cross-sectional views of alternative boron nitride layers of the fiber coating system.
Figure 2B:
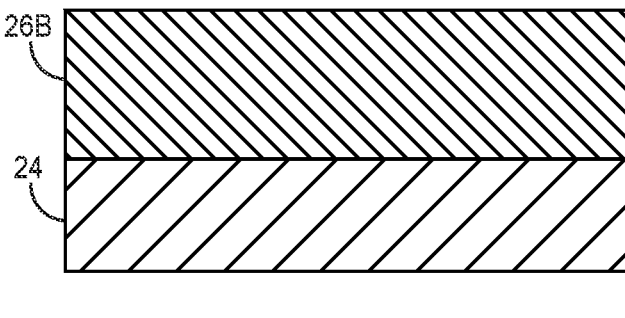

FIGS. 2A and 2B are simplified cross-sectional illustrations of alternative outer BN layers 26A and 26B, respectively, and outer TGO layer 24, shown for simplicity in isolation from the rest of fiber coating system 14. FIG. 2A illustrates a partially-aligned outer BN layer 26A which includes anisotropic region 30 and isotropic region 32. Anisotropic region 30 can alternatively be referred to as a relatively "more ordered" or "more aligned" region, while isotropic region 32 can alternatively be referred to as a relatively "less ordered" or "less aligned" region. As shown, anisotropic region 30 is disposed immediately adjacent outer TGO layer 24, with isotropic region 32 on a side/surface of anisotropic region 30 opposite outer TGO layer 24. Anisotropic region 30 can be characterized as having a more ordered/aligned microstructure than isotropic region 32. More specifically, anisotropic region 30 exhibits a more crystalline three-dimensional structure of hexagonal BN (h-BN) oriented such that the basal planes (i.e., planes of covalently bonded B and N atoms) align in a direction parallel to longitudinal fiber axis A, and are further aligned with respect to one another. Such alignment is promoted by outer TGO layer 24. Isotropic region 32 can have a generally less ordered/aligned microstructure as compared to anisotropic region 30, for example, exhibiting more turbostratic characteristics with reduced alignment among basal planes. FIG. 2B illustrates a mostly to fully-aligned outer BN layer 26B. Outer BN layer 26B can be formed almost entirely of aligned h-BN such that it is analogous with anisotropic region 30 of FIG. 2A. The foregoing discussion of alignment within and resulting properties of outer BN layers 26A and 26B can also apply to inner BN layer 20. Additionally, and as indicated by the anisotropic and isotropic labels, anisotropic region 30 can have direction-dependent properties (e.g., mechanical, physical, thermal, and electrical) and isotropic region 32 can have direction independent properties.

As mentioned above, TGO layers 18, and/or 24 have been observed to promote alignment of h-BN in the adjacent BN layers 20 and 26, respectively. The greater the extent of aligned h-BN (i.e., anisotropic region 30), the better the benefits (e.g., improved toughness and/or oxidation resistance) conferred to CMC 10 by BN layers 20 and 26. As cracks propagate through matrix 16 and into fiber coating system 14, outer BN layer 26 can, with its weakly bonded basal planes, deflect cracks away from outer TGO layer 24 and become debonded. Thereafter, sliding of matrix 16 can occur generally in the direction of the aligned h-BN and fiber 12. This "smooth" sliding interface helps frictionally reload matrix 16 and increase the strength of CMC 10.

Silicon within SiC layer 22 can oxidize to form a protective silica layer, preventing any oxidized and/or molten boron from outer BN layer 26 from infiltrating inner layers and fiber 12. It is therefore desirable to create a relatively thick (e.g., 250 nm to 500 nm) SiC layer 22. However, the roughness of SiC layer 22 generally increases with thickness, as the formation of columnar grains of SiC in the layer can grow radially outward, relative to axis A, forming nodules on the outer surface of SiC layer 22. The formation of outer TGO layer 24 on SiC layer 22 can reduce the presence of such nodules, creating a smoother interface with outer BN layer 26. If included, SiBN layer 28 can increase the silicon content of fiber coating system 14, oxidizing to form, with boron, a more stable glassy material than molten boron (i.e., boria) alone.

Figure 3:
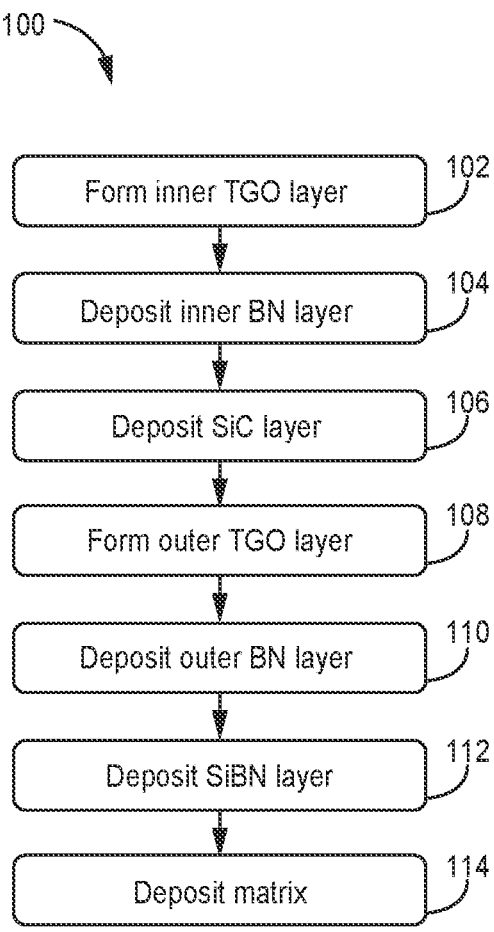
FIG. 3 is a flowchart illustrating a method of forming the CMC of FIG. 1.

FIG. 3 is a method flowchart illustration steps 102-114 of method 100 for forming a CMC, such as CMC 10, with fiber coating system 14. At step 102, a preform of multiple fibers 12 can be placed in tooling to undergo formation of inner TGO layer 18. In this step, the preform can be exposed to temperatures ranging from 800° C. to 1200° C. for one hour to 24 hours. This causes oxidation of silicon within the SiC fiber 12 to form a layer (i.e., inner TGO layer 18) of silicon dioxide ($SiO_2$). In an embodiment with only a single TGO layer in coating system 14, step 102 can be optionally omitted. The process parameters (e.g., temperature and duration) selected at step 102 can be varied to control oxide growth. For example, a relatively uniform TGO layer 18 of around 50 nm can be formed on the majority of preform fibers 12 at 800° C. for 24 hours. A thicker (e.g., 100 nm) TGO layer 18 can be formed at 900° C. for 24 hours, but it may be thicker on external preform fibers 12 (i.e., those in outer fiber layers) versus internal fibers 12. If a shorter duration and/or increased thickness (e.g., >200 nm) are desirable, the applied temperature can be >1000° C., although uniformity of TGO layer 18 through the thickness of the preform will vary more at these higher temperatures.

At step 104, inner BN layer 20 can be deposited on inner TGO layer 18, if included, and on fiber 12 if not. Subsequently, at step 106, SiC layer 22 can be deposited on inner BN layer Both steps 104 and 106 employ chemical vapor infiltration (CVI) to deposit the BN and SiC, respectively.

At step 108, outer TGO layer 24 can be formed. Like step 102, the preform, albeit in a partially-coated state, can be exposed to temperatures ranging from 800° C. to 1200° C. for one hour to 24 hours. This causes oxidation of silicon within SiC layer 22, thus forming a layer (i.e., outer TGO layer 24) of $SiO_2$. Step 108 can be optionally omitted if only inner TGO layer 18 is desired.

At step 110, outer BN layer 26 can be deposited on outer TGO layer, if included, and on SiC layer 22 if not. As with step 104, outer BN layer can be deposited using CVI. At step 112, SiBN layer 28 can also be deposited using CVI. Step 112 can optionally be omitted if SiBN layer 28 is not to be included.

At step 114, matrix 16 can be deposited on coating system 14 of the preform. Matrix 16 can be deposited using CVI, which can be carried out until the resulting CMC (e.g., CMC 10) has reached the desired residual porosity. Other techniques for matrix formation are contemplated herein, such as one or a combination of slurry infiltration, melt infiltration, and polymer infiltration and pyrolysis. Protective coatings for the CMC (e.g., thermal barrier coatings, environmental barrier coatings, etc.) can optionally be applied after step 114.

A CMC component formed with the disclosed fiber coating systems can be incorporated into aerospace, maritime, or industrial equipment, to name a few, non-limiting examples.

Discussion of Possible Embodiments

The following are non-exclusive descriptions of possible embodiments of the present invention.

A coated fiber structure for use in a ceramic matrix composite comprises a fiber and a coating system applied to and circumscribing the fiber. The coating system comprises a first boron nitride layer, a silicon carbide layer extending coaxially with and in direct contact with the first boron nitride layer, a first thermally-grown oxide layer formed on the silicon carbide layer, and a second boron nitride layer extending coaxially with and in direct contact with the first thermally-grown oxide layer.

The fiber structure of the preceding paragraph can optionally include, additionally and/or alternatively, any one or more of the following features, configurations and/or additional components:

In the above fiber structure, the second boron nitride layer can include an anisotropic region adjacent the first thermally-grown oxide layer.

In any of the above fiber structures, the second boron nitride layer can further include an isotropic region on a side of the anisotropic region opposite the first thermally-grown oxide layer.

In any of the above fiber structures, the first boron nitride layer can have a thickness ranging from 50 nm to 200 nm, the silicon carbide layer can have a thickness ranging from 50 nm to 500 nm, the first thermally-grown oxide layer can have a thickness ranging from 50 nm to 200 nm, and the second boron nitride layer can have a thickness ranging from 50 nm to 200.

In any of the above fiber structures, the silicon carbide layer can have a thickness ranging from 250 nm to 500 nm.

Any of the above fiber structures can further include a second thermally-grown oxide layer formed on the fiber and in direct contact with the first boron nitride layer, such that the first boron nitride layer extends coaxially with and in direct contact with the second thermally-grown oxide layer.

In any of the above fiber structures, the first boron nitride layer can include an anisotropic region adjacent the second thermally-grown oxide layer.

In any of the above fiber structures, the second boron nitride region can further include an isotropic region on a side of the anisotropic region opposite the second thermally-grown oxide layer In any of the above fiber structures, the second thermally-grown oxide layer can have a thickness ranging from 50 nm to 100 nm.

Any of the above fiber structures can further include a silicon-doped boron nitride layer extending coaxially with and in direct contact with the second boron nitride layer, the silicon-doped boron nitride layer having a thickness ranging from 50 nm to 200 nm.

A ceramic matrix composite can include a plurality of any of the above fiber structures, and a silicon carbide matrix formed upon the second boron nitride layer of the plurality of fiber structures.

A method of forming a ceramic matrix composite comprises forming a fibrous preform by arranging a plurality of ceramic fibers, depositing a first boron nitride layer on the plurality of ceramic fibers, depositing a silicon carbide layer on the first boron nitride layer, forming a first thermally-grown oxide layer on the silicon carbide layer, and depositing a second boron nitride layer on the first thermally-grown oxide layer. The method further comprises depositing a silicon carbide matrix on the fibrous preform.

The method of the preceding paragraph can optionally include, additionally and/or alternatively, any one or more of the following features, configurations and/or additional components:

In the above method, the second boron nitride layer can include an anisotropic region adjacent the first thermally-grown oxide layer, and an isotropic region on a side of the anisotropic region opposite the first thermally-grown oxide layer.

Any of the above methods can further include prior to depositing the first boron nitride layer, forming a second thermally-grown oxide layer on the plurality of ceramic fibers, such that the first boron nitride layer is deposited on the second thermally-grown oxide layer.

In any of the above methods, the first boron nitride layer can include an anisotropic region adjacent the second thermally-grown oxide layer, and an isotropic region on a side of the anisotropic region opposite the second thermally-grown oxide layer.

In any of the above methods, forming the first thermally-grown oxide layer and the second thermally-grown oxide layer can include heating the preform to a temperature ranging from 800° C. to 1200° C. for a period ranging from one hour to 24 hours.

In any of the above methods, the step of depositing each of the first boron nitride layer, the silicon carbide layer, and the second boron nitride layer can include chemical vapor infiltration.

Any of the above methods can further include prior to depositing the silicon carbide matrix, depositing a silicon-doped boron nitride layer on the second boron nitride layer.

In any of the above methods, the step of depositing the silicon-doped boron nitride layer can include chemical vapor infiltration.

In any of the above methods, the step of depositing the silicon carbide matrix can include at least one of chemical vapor infiltration, slurry infiltration, melt infiltration, and polymer infiltration and pyrolysis.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A coated fiber structure for use in a ceramic matrix composite, the coated fiber structure comprising:
   a fiber comprising silicon carbide; and
   a coating system applied to and circumscribing the fiber, the coating system comprising:
      a first thermally-grown oxide layer formed on the fiber, wherein the first thermally-grown oxide layer comprises silica;
      a first boron nitride layer extending coaxially with and in direct contact with the first thermally-grown oxide layer, wherein the first boron nitride layer comprises an anisotropic region adjacent to the first thermally grown oxide layer;
      a silicon carbide layer extending coaxially with and in direct contact with the first boron nitride layer;
      a second thermally-grown oxide layer formed on the silicon carbide layer, wherein the second thermally-grown oxide layer comprises silica; and
      a second boron nitride layer extending coaxially with and in direct contact with the second thermally-grown oxide layer, wherein the second boron nitride layer comprises an anisotropic region adjacent to the second thermally grown oxide layer.

2. The coated fiber structure of claim 1, wherein the second boron nitride layer further comprises an isotropic region on a side of the anisotropic region opposite the second thermally-grown oxide layer.

3. The coated fiber structure of claim 1, wherein:
   the first boron nitride layer has a thickness ranging from 50 nm to 200 nm;
   the silicon carbide layer has a thickness ranging from 50 nm to 500 nm;
   the second thermally-grown oxide layer has a thickness ranging from 50 nm to 200 nm; and
   the second boron nitride layer has a thickness ranging from 50 nm to 200.

4. The coated fiber structure of claim 3, wherein the silicon carbide layer has a thickness ranging from 250 nm to 500 nm.

5. The coated fiber structure of claim 3, wherein the second first boron nitride layer further comprises an isotropic region on a side of the anisotropic region opposite the first thermally-grown oxide layer.

6. The coated fiber structure of claim 3, wherein the first thermally-grown oxide layer has a thickness ranging from 50 nm to 100 nm.

7. The coated fiber structure of claim 3 and further comprising: a silicon-doped boron nitride layer extending coaxially with and in direct contact with the second boron nitride layer, the silicon-doped boron nitride layer having a thickness ranging from 50 nm to 200 nm.

8. A ceramic matrix composite comprising:

a plurality of the coated fiber structures of claim 1; and a silicon carbide matrix formed upon the second boron nitride layer of the plurality of the coated fiber structures.

9. A method of forming a ceramic matrix composite, the method comprising:

forming a fibrous preform by:

arranging a plurality of ceramic fibers;

forming a first thermally-grown oxide layer on the plurality of ceramic fibers;

depositing a first boron nitride layer on the first thermally-grown oxide layer, wherein the first boron nitride layer extends coaxially and is in direct contact with the first thermally-grown oxide layer;

depositing a silicon carbide layer on the first boron nitride layer;

forming a second thermally-grown oxide layer on the silicon carbide layer, wherein the second thermally-grown oxide layer comprises silica; and depositing a second boron nitride layer on the second thermally-grown oxide layer, wherein the second boron nitride layer extends coaxially and is in direct contact with the second thermally-grown oxide layer; and depositing a silicon carbide matrix on the fibrous preform.

10. The method of claim 9, wherein the second boron nitride layer comprises:

an anisotropic region adjacent the second thermally-grown oxide layer; and an isotropic region on a side of the anisotropic region opposite the second thermally-grown oxide layer.

11. The method of claim 9, wherein the first boron nitride layer comprises:

an anisotropic region adjacent the first thermally-grown oxide layer; and an isotropic region on a side of the anisotropic region opposite the first thermally-grown oxide layer.

12. The method of claim 11, wherein forming the first thermally-grown oxide layer and the second thermally-grown oxide layer comprises heating the preform to a temperature ranging from 800° C. to 1200° C. for a period ranging from one hour to 24 hours.

13. The method of claim 9, wherein the step of depositing each of the first boron nitride layer, the silicon carbide layer, and the second boron nitride layer comprises chemical vapor infiltration.

14. The method of claim 9 and further comprising: prior to depositing the silicon carbide matrix, depositing a silicon-doped boron nitride layer on the second boron nitride layer.

15. The method of claim 14, wherein the step of depositing the silicon-doped boron nitride layer comprises chemical vapor infiltration.

16. The method of claim 9, wherein the step of depositing the silicon carbide matrix comprises at least one of chemical vapor infiltration, slurry infiltration, melt infiltration, and polymer infiltration and pyrolysis.

\* \* \* \* \*